US008481840B2

(12) United States Patent
Dangerfield

(10) Patent No.: US 8,481,840 B2
(45) Date of Patent: Jul. 9, 2013

(54) BUTTON SHAPED PORTABLE MEDIA PLAYER WITH INDICIA

(75) Inventor: Nicholas E. Dangerfield, New York, NY (US)

(73) Assignee: Parte LLC, New York, NY (US)

( * ) Notice: Subject to any disclaimer, the term of this patent is extended or adjusted under 35 U.S.C. 154(b) by 9 days.

(21) Appl. No.: 13/052,857

(22) Filed: Mar. 21, 2011

(65) Prior Publication Data

US 2011/0226115 A1 Sep. 22, 2011

Related U.S. Application Data

(60) Provisional application No. 61/315,610, filed on Mar. 19, 2010.

(51) Int. Cl.
*G10H 1/32* (2006.01)
*G06F 17/00* (2006.01)

(52) U.S. Cl.
USPC .................................. 84/634; 84/644; 700/94

(58) Field of Classification Search
USPC ............................................................ 84/634
See application file for complete search history.

(56) References Cited

U.S. PATENT DOCUMENTS

| | | | | |
|---|---|---|---|---|
| 6,423,892 | B1 | 7/2002 | Ramaswamy | |
| 7,559,089 | B2 | 7/2009 | Kroll et al. | |
| 7,562,394 | B2 | 7/2009 | Kroll et al. | |
| 7,882,563 | B2 | 2/2011 | Kroll et al. | |
| 7,900,009 | B2 | 3/2011 | Levy | |
| 2002/0034302 | A1 | 3/2002 | Moriai et al. | |
| 2002/0077988 | A1 | 6/2002 | Sasaki et al. | |
| 2004/0059927 | A1 | 3/2004 | Chen | |
| 2006/0020890 | A1 | 1/2006 | Kroll et al. | |
| 2006/0020901 | A1* | 1/2006 | Kroll et al. | 715/772 |
| 2006/0020968 | A1 | 1/2006 | Kroll et al. | |
| 2006/0076375 | A1 | 4/2006 | Bhakta | |
| 2006/0088699 | A1 | 4/2006 | Yeh | |
| 2006/0276920 | A1 | 12/2006 | Leung | |

(Continued)

FOREIGN PATENT DOCUMENTS

| | | |
|---|---|---|
| KR | 10-0637597 | 10/2006 |
| KR | 10-2007-0000045 | 1/2007 |

OTHER PUBLICATIONS

"Our Products." Findaway World—Our Products. Findway World, n.d. Web. Sep. 6, 2011. <http://www.findawayworld.com/what-we-do/our-products/>.

*Primary Examiner* — Christopher Uhlir
(74) *Attorney, Agent, or Firm* — Leason Ellis LLP

(57) ABSTRACT

In one embodiment of the present invention, a portable media player has the form of a wearable button and includes a body that has a front face and a rear face. The media player also has a means for detachably attaching the body to an article of clothing, such as a shirt or jacket. The player has a memory that contains at least one audio file and also includes means for converting the audio file into an analogue sound signal, wherein the content of the memory is factory programmed and cannot be changed by the user. Playback controls are provided to permit playing of the audio file stored in memory. In accordance with the present invention, artist indicia are fixedly disposed on the front face of the body. The indicia correspond to the content of the audio file. For example, the indicia can include the name of the artist and/or the name of the song and/or contain graphics that are associated with the artist of the audio file content.

17 Claims, 2 Drawing Sheets

U.S. PATENT DOCUMENTS

| | | | | |
|---|---|---|---|---|
| 2007/0058819 | A1 | 3/2007 | Hertz et al. | |
| 2007/0099681 | A1 | 5/2007 | Kielland | |
| 2007/0282972 | A1 | 12/2007 | Kroll et al. | |
| 2007/0298840 | A1 | 12/2007 | Squires | |
| 2008/0065246 | A1 | 3/2008 | Zorkendorfer et al. | |
| 2009/0030538 | A1 * | 1/2009 | Levy | 700/94 |

* cited by examiner

BUTTON SHAPED PORTABLE MEDIA PLAYER WITH INDICIA

CROSS REFERENCE TO RELATED APPLICATION

The present application claims the benefit of U.S. patent application Ser. No. 61/315,610, filed Mar. 19, 2010, which are hereby incorporated by reference in their entirety.

TECHNICAL FIELD

The present invention relates to portable media players and in particular, to a portable media player that has a button shape and includes indicia that directly relates to content stored in the media player.

BACKGROUND

Over the years, portable audio or media players have become increasingly more popular and are some of the more commonly owned electronic consumer products. Portable players are used in any number of different settings. For example, many people use portable players while exercising, e.g., outdoors or in the gym, and many use the players while commuting or walking between locations.

Generally, a portable audio player is a personal mobile device that allows the user to listen to recorded audio while mobile. A personal player refers to a portable audio player that is listened to with headphones. Many times, these players also can receive broadcast radio signals, such as AM and FM signals.

One of the first portable players that enjoyed widespread success was a compact cassette player, such as the Sony Walkman introduced in 1979. As technology advanced, different types of portable players became popular and mainstream. For example, compact disc players that played commercial CDs enjoyed success and the later models were able to play recordable CDR and CDRW media. The next breakthrough in technology resulted in digital audio players becoming available. The players were based on flash memory or hard disk storage. Files were usually compressed using lossy compression; this reduces file size at the cost of some loss of quality. The advantage of solid-state digital audio players over hard disks and CDs is resistance to vibration, small size and weight, and low battery usage.

Digital audio players are designed so that a user can download content into the memory of the player. The audio content of the player is therefore dynamic and can be easily changed by the user by simply deleting files that the user is no longer interested in and/or downloading new files. The player typically includes a display screen, such as an LED screen, which displays certain information, such as the track number, the name and/or selection being played, radio station, etc.

These type of players are thus of a type that the consumer has access rights and where the content storage is dynamic and can be changed by the end user. The players can be worn on the body by using a strap, belt or the like.

Nonprogrammable (closed) players can also come in different forms, such as an electronic greeting card. The card will typically play a song, such as Happy Birthday, when the consumer opens the card. The card has a micro speaker, a coil cell and simple leaf switch that opens and closes the circuit based on the opening and closing of the greeting card itself. However, this type of device is not intended to be worn and function as a media player for the listening pleasure of an end user.

SUMMARY

In one embodiment of the present invention, a portable media player has the form of a wearable button and includes a body that has a front face and a rear face. The media player also has a means for detachably attaching the body to an article of clothing, such as a shirt or jacket. The player has a memory that contains at least one audio file and also includes means for converting the audio file into an analogue sound signal, wherein the content of the memory cannot be changed by the user. In other words, the memory is a factory programmed memory and the player of the present invention does not have a data port to allow the user to write to the memory. Playback controls are provided to permit playing of the audio file stored in memory. In accordance with the present invention, artist indicia are fixedly disposed on the front face of the body. The indicia correspond to the content of the audio file. For example, the indicia can include the name of the artist and/or the name of the song and/or contain graphics that are associated with the artist of the audio file content.

These and other aspects, features and advantages shall be apparent from the accompanying Drawings and description of certain embodiments of the invention.

DETAILED DESCRIPTION OF CERTAIN EMBODIMENTS OF THE INVENTION

Figure 1:
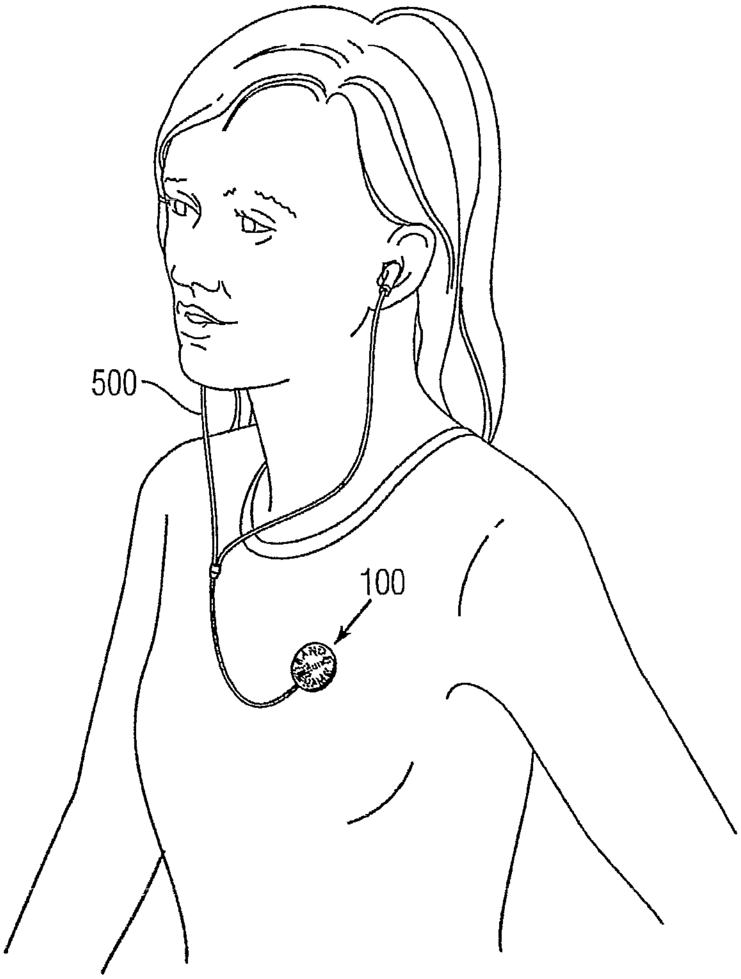
FIG. 1 is a perspective view of a button shaped portable media player with indicia according to one exemplary embodiment of the present invention.
Figure 2:
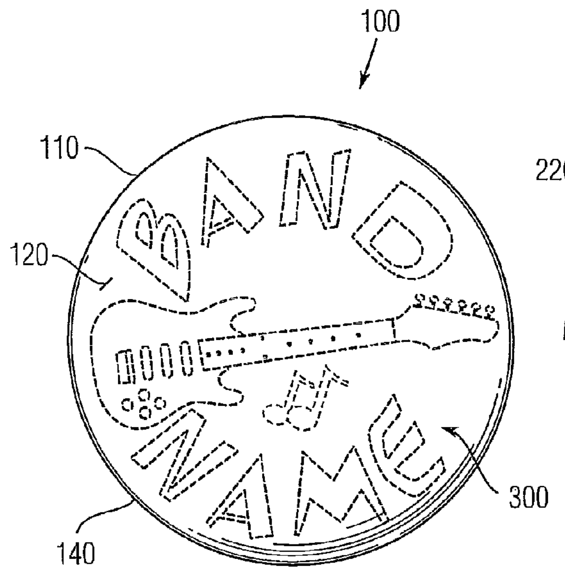
FIG. 2 is front elevation view of the player of FIG. 1.

In accordance with a first embodiment of the present invention, a portable media player 100 is illustrated in FIGS. 1-5. The portable media player 100 is in the form of a wearable button and includes a button body 110 having a front face or surface 120 and an opposite rear face or surface 130. The button body 110 has a peripheral side wall 140 that extends between the front and rear surfaces 120, 130.

While in the illustrated embodiment, the body 110 has a circular shape, it will be understood that the body 110 can have other shape, such as a shape selected from the group consisting of a square, a rectangle, a triangle, and an oval.

The button shaped media player 100 is intended to be worn on a body of a user similar to how a conventional button is worn. More specifically, the player 100 includes a means 200 to allow the player 100 to be worn on the user's body. The means 200 can be any number of different types of conventional coupling techniques (mechanical fastening) to detachably attach the player 100. The embodiment shown in FIGS. 1-4 uses a pinback structure 200 as the means for attaching the button body 110 to an article of clothing worn by the user. The pinback structure 200 is disposed along the rear surface 130 and includes a depressable pin 210 that engages and locks with a pin clasp 220 to securely attach the button body 110 to the clothing. In an unlocked position, the pin 210 is free of the pin clasp 220 and this allows the pin 210 to be inserted through the article of clothing and then engaged with the pin clasp 220 to securely attach the button.

It will be appreciated that a pinback structure is only one type of structure for attaching a button to clothing. Other clasp or clamp or other structures are equally possible for removably attaching the button player 100 to the article of clothing.

In accordance with the present invention, the front face 120 includes indicia 300 that corresponds to the content that is stored in memory. In other words, the indicia 300 is artist indicia that is representative of the song(s) stored in memory. For example, the indicia 300 can be a graphic representation of at least one or more of the following: the name of the artist, the song title, an album cover, or other indicia that is representative of the content stored in memory.

In one embodiment, only a single song is stored in memory of the player 100 and the indicia 300 lists the artist name and/or song title and/or contains a graphical image that is representative thereof.

It will be appreciated that the indicia 300 on the front face 120 is thus fixed (static) just as is the stored content in memory is fixed and cannot be changed by the end user.

The player 100 can therefore serve as a promotional item for promoting an artist's song or a selection of songs by an artist. The player 100 can also be used to promote an event or venue as well. This item can be simply given away due to its relatively low manufacturing cost or can be sold at an event related to the artist, such as a concert or the like. The recipient or consumer can simply attach the player 100 to the article of clothing and then actuate the player to allow listening of the content thereof.

The size of the player 100 can vary depending upon the application; however, the player 100 should be of a size that can be comfortable worn on the user's article of clothing and due to the relatively simply electronics, described below, that are contained within the player 100, the player 100 can have a relatively small size, such as a size slightly bigger than a quarter. However, it can have a larger size if more space is needed to place the desired indicia 300 on the front face 120.

Since there is no dynamic display, the indicia 300 is limited to representing the content stored in memory and the content cannot be manipulated in any manner. The user can only simply play the media and stop the playing of the media at any point in time. In other words, the consumer has no access right (since there are no data ports or the like) and instead, the memory is factory programmed. In one embodiment, the memory can be of a WORM type (write once, read many), which refers to data storage media that can be written to once, but read from multiple times. It will be appreciated that other types of memory can be used so long as the end user does not have access rights to the memory and thus cannot alter the content of the memory.

In one embodiment, the memory storage is large enough to be able to contain a CD quality type of audio (e.g., 700 MB or more).

As a result, since the player 100 is a closed media player in that there is no consumer access right, the player 100 includes only limited playback controls. For example, the player 100 can include a first button 400 (play button) and a second button 410 (stop button). The first and second buttons 400, 410 are disposed along the peripheral side wall 140 of the body 110.

To play the content, the user simply presses the first button 400 and to stop the play, the user simply presses the second button 410. The electronics of the player 400 can be configured so that the player 400 is powered on by pressing the play button 400 and to power off, the user can hold down the stop button 410 for a prescribed period of time (as opposed to merely pressing the stop button once to stop play).

In terms of playback volume, the player 100 can be designed so that there is only one preselected playback volume and thus, there is no need for any volume controls. Alternatively, the playback controls can include volume control buttons (+ and − buttons) that can be located along the peripheral side wall 140. For ease of illustration, the present figures show the first embodiment where the volume is set at a prescribed setting and cannot be changed by the user.

To allow listening of the content through headphones 500, the player 100 includes a headphone jack 420 (audio port) that is disposed within the body 110 of the player 100. The jack 420 is thus open along the peripheral side wall 140 of the body 110 and is configured to receive a plug of the headphones 500. The headphones 500 are conventional headphones that are configured to be worn with portable media players.

Figure 5:
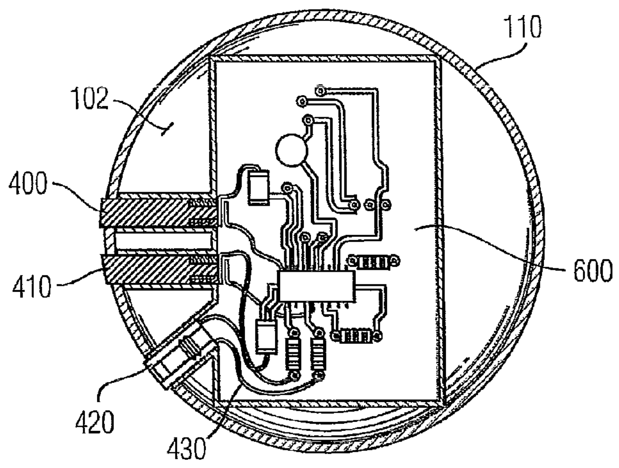
FIG. 5 is a cross-sectional view of the player of FIG. 1.

FIG. 5 is a cross-sectional view of the player 100 taken through the body 110 to illustrate the inner components of the player 100. For example, the player 100 includes an inner compartment or cavity 102 that contains electronics that allow storage and controlled play of media content (e.g., a song or selection of songs that is saved as compressed audio files).

The player 100 is similar to most MP3 players and includes a memory storage device (e.g., flash memory or a miniature hard disk drive), an embedded processor, and a microchip (audio codec chip) to cover the compressed audio file into an analogue sound signal.

The electronics thus generally include a processor 600 (microchip) that has memory (e.g., internal flash memory (solid-state memory)) for storing the media and is electrically connected to the first and second buttons 400, 410 and the jack 420. For example, electrical leads or contacts 430 connect the buttons 400, 410 and the jack 420 to the processor 600 to allow the limited control of the player as described herein. A power source (not shown) is likewise included within the inner compartment 102. The power source is electrically connected to the processor 600 and can be in the form of one or more batteries.

It will be appreciated that other conventional components found in media players can be included as part of the electronics. For simplicity, the processor 600 is understood to include conventional electronic components that process the stored media to allow for playback, e.g., a digital signal processor (DSP), amplifier, etc.

Once again, the player 100 is not an open, fully writable device and therefore it does not include a data port to allow content to be uploaded and/or downloaded externally from a device, such as a personal computer, to the memory. As described previously, the content stored in memory is static and at the time of manufacturing the chip (processor 600), the content is stored in memory to allow subsequent assembling and sealing of the player 100.

Figure 3:
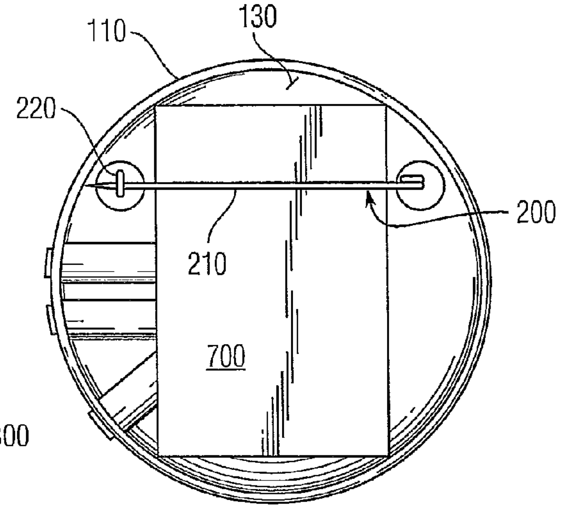
FIG. 3 is a rear elevation view of the player of FIG. 1.
Figure 4:
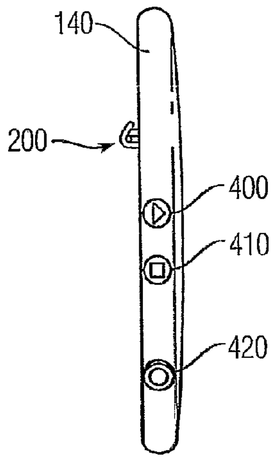
FIG. 4 is a side elevation view of the player of FIG. 1.

As can be seen in FIG. 3, a cover 700 or the like can be included as part of the rear face 130 of the body 110. For example, the cover 700 can be located underneath the movable pin of the pinback structure 200. The cover 700 can be fastened to the body 110 using conventional means, such as a snap-fit.

While the invention has been described in connection with certain embodiments thereof, the invention is capable of being practiced in other forms and using other materials and structures. Accordingly, the invention is defined by the recitations in the claims appended hereto and equivalents thereof.

What is claimed is:

1. A media player comprising:

a body having a button shape, the body having a front face and a rear face;

a means for detachably attaching the body to an article of clothing, the means being in the form of a pinback structure that is disposed along the rear face of the body, wherein the pinback structure includes a depressable pin that extends across the rear face of the body and engages and locks with a pin clasp that is contained within the body;

a processor including memory that contains at least one audio file, wherein the memory is factory programmed and therefore the content of the memory cannot be changed by an end user; playback controls to permit playing of the at least one audio file stored in memory and permit the play of the at least one audio file to be stopped; and artist indicia formed on the front face, the indicia relating to the content stored in the at least one audio file.

2. The media player of claim 1, wherein the button shaped body has a circular shape.

3. The media player of claim 1, wherein the means for detachably attaching the body to the article of clothing comprises a pinback structure.

4. The media player of claim 1, wherein the playback controls includes a play button that when actuated causes play of the at least one audio file and a stop button that when actuated causes the at least one audio file to stop playing.

5. The media player of claim 1, wherein the artist indicia includes at least one of a name of the artist, a song title and a graphic cover associated with the at least one audio file.

6. The media player of claim 1, wherein the artist indicia, includes at least one of text and graphics.

7. The media player of claim 1, wherein the playback controls are located along a peripheral side edge that is located between the front face and the rear face.

8. The media player of claim 1, wherein the body further includes a headphone jack to permit headphones to be worn to listen to the at least one audio file.

9. The media player of claim 8, wherein the headphone jack is located along a peripheral side edge that is located between the front face and the rear face.

10. The media player of claim 1, wherein the memory includes at least two different audio files containing music of a single artist.

11. The media player of claim 1, wherein the at least one audio file includes music of an artist.

12. The media player of claim 1, further including a power source.

13. The media player of claim 1, wherein the player is free of any data ports that permit a file to be saved to the memory or deleted from the memory.

14. The media player of claim 1 wherein the body has a shape selected from the group consisting of a square, a rectangle, a triangle, and an oval.

15. A portable media player in the form of a wearable button comprising:

a body having a button shape, the body having a front face and a rear face;

a means for detachably attaching the body to an article of clothing, wherein the means comprises a pinback structure that is disposed along the rear face proximate a top edge of the body and includes a depressable pin that extends across the rear face of the body and engages and locks with a pin clasp that is contained within the body;

a memory that contains at least one audio file;

means for converting the at least one audio file into an analogue sound signal, wherein the content of the memory cannot be changed by an end user;

playback controls to permit playing of the at least one audio file stored in memory, wherein the playback controls are all disposed below the pinback structure along a peripheral side wall of the body;

a headphone jack disposed along the peripheral side wail of the body between the playback controls and a bottom edge of the body; and artist indicia that is formed on the from face of the body, the indicia corresponding to the content of the least one audio file.

16. The media player of claim 15, wherein the body is free of any data port that allows the end user to change the content of the memory.

17. The media player of claim 15, further including a power source that is contained within an interior compartment of the body and is covered with a removable cover, the cover being located along the rear face beneath the depressable pin.

* * * * *